US011184217B2

(12) United States Patent
Negishi

(10) Patent No.: US 11,184,217 B2
(45) Date of Patent: *Nov. 23, 2021

(54) REMOTE MANAGEMENT AGENT APPARATUS, REMOTE MANAGEMENT SYSTEM, AND REMOTE MANAGEMENT METHOD

(71) Applicant: Ricoh Company, Ltd., Tokyo (JP)

(72) Inventor: Yuuichiroh Negishi, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/910,523

(22) Filed: Jun. 24, 2020

(65) Prior Publication Data

US 2020/0322212 A1    Oct. 8, 2020

Related U.S. Application Data

(63) Continuation of application No. 15/915,557, filed on Mar. 8, 2018, now Pat. No. 10,735,244.

(30) Foreign Application Priority Data

Mar. 21, 2017    (JP) .............................. JP2017-054876

(51) Int. Cl.
*H04L 12/24* (2006.01)
*H04L 29/08* (2006.01)
*H04L 29/06* (2006.01)

(52) U.S. Cl.
CPC ........ *H04L 41/046* (2013.01); *H04L 41/0213* (2013.01); *H04L 41/0226* (2013.01);
(Continued)

(58) Field of Classification Search
CPC ............... H04L 41/046; H04L 41/0213; H04L 41/0226; H04L 67/02; H04L 67/10; H04L 69/18
See application file for complete search history.

(56) References Cited

U.S. PATENT DOCUMENTS 9,413,907 B2    8/2016 Imai
2004/0243994 A1    12/2004 Nasu
(Continued)

FOREIGN PATENT DOCUMENTS

JP    2000-224262    8/2000
JP    2009-032277    2/2009

OTHER PUBLICATIONS

Extended European Search Report for 18161505.5 dated Jun. 8, 2018.
Japanese Office Action for 2017-054876 dated Jun. 29, 2021.

*Primary Examiner* — Nasser M Goodarzi
*Assistant Examiner* — Adil Ocak
(74) *Attorney, Agent, or Firm* — IPUSA, PLLC

(57) ABSTRACT

A remote management agent apparatus for a remote management system is provided. The remote management system includes a remote device management apparatus and a management target device managed by the remote device management apparatus remotely. The remote management agent apparatus is configured to receive request data issued from a remote device management apparatus to a management target device managed by the remote device management apparatus remotely; to identify, from among multiple device agent apparatuses configured to transmit data received from the remote management agent apparatus to the management target device, a device agent apparatus capable of communicating in compliance with a communication mode supported by the management target device; and to forward the request data to the identified device agent apparatus to cause the identified device agent apparatus to transmit the request data to the management target device.

20 Claims, 10 Drawing Sheets

(52) U.S. Cl.
CPC .............. *H04L 67/02* (2013.01); *H04L 67/10* (2013.01); *H04L 69/18* (2013.01)

(56) References Cited

U.S. PATENT DOCUMENTS

| | | |
|---|---|---|
| 2010/0106817 A1 | 4/2010 | Jang |
| 2013/0070780 A1 | 3/2013 | Hozumi |
| 2015/0263907 A1 | 9/2015 | Negishi |
| 2017/0048194 A1 | 2/2017 | Helms et al. |

FIG.7

| DEVICE AGENT APPARATUS IDENTIFIER | MANAGEMENT TARGET DEVICE IDENTIFIER |
|---|---|
| Gateway12345 | Device111111 |
| Gateway12345 | Device222222 |
| Gateway12345 | Device333333 |
| Gateway12348 | Device444444 |
| Gateway12348 | Device555555 |
| Gateway12348 | Device666666 |
| ... | ... |

FIG.8

| REMOTE DEVICE MANAGEMENT APPARATUS IDENTIFIER | DEVICE AGENT APPARATUS IDENTIFIER |
|---|---|
| Application_a | Gateway12345 |
| Application_b | Gateway12346 |
| Application_a | Gateway12347 |
| Application_a | Gateway12348 |
| Application_b | Gateway12350 |
| Application_c | Gateway12390 |
| ... | ... |

FIG.9

| ITEM | DESCRIPTION |
|---|---|
| Protocol Type | Information for identifying a communication protocol such as HTTP or SNMP |
| Supported Device Type | Device type supporting communication mode |
| Communication Port | Information of communication port such as 80/tcp |
| Detailed Definition of Communication Protocol | Detailed definition for each protocol |

FIG.10

| ITEM | DESCRIPTION |
|---|---|
| Device Identifier | Information for uniquely identifying device such as MAC address |
| Device Type | Information representing device type.<br>Used for matching device with communication mode definition |
| IP Address | IP address of device |
| Additional Information | Monitoring interval, network IF used for communication, etc. |

REMOTE MANAGEMENT AGENT APPARATUS, REMOTE MANAGEMENT SYSTEM, AND REMOTE MANAGEMENT METHOD

CROSS-REFERENCE TO RELATED APPLICATION

The present application is a continuation of patent application Ser. No. 15/915,557 filed on Mar. 8, 2018, which claims priority under 35 U.S.C. § 119 to Japanese Patent Application No. 2017-054876, filed on Mar. 21, 2017, the contents of which are incorporated herein by reference in their entirety.

BACKGROUND OF THE INVENTION

1. Field of the Invention

The present disclosure relates to a remote management agent apparatus, a remote management system, and a remote management method.

2. Description of the Related Art

There is known a remote management system managing a number of electronic devices connected to a network from a remote location. In the technical field of the remote management system, also is known a technique for managing electronic devices provided inside a firewall from a remote location outside the firewall, by installing an agent device inside the firewall.

For example, in a remote management method of an imaging device disclosed in Japanese Unexamined Patent Application Publication No. 2009-32277, an agent device is installed in a local area network in which a firewall is provided. A management command issued from the management device to the agent device is transmitted via the firewall. In response to the management command, the agent device obtains status data from the imaging device and sends back to the management device via the Internet. According to the technique, it is possible to manage an imaging device in a local area network in which a firewall is provided from a management device in a remote location.

SUMMARY OF THE INVENTION

According to one aspect of the present disclosure, a remote management agent apparatus for a remote management system is provided. The remote management agent apparatus is configured to receive request data issued from a remote device management apparatus to a management target device managed by the remote device management apparatus remotely; to identify, from among multiple device agent apparatuses configured to transmit data received from the remote management agent apparatus to the management target device, a device agent apparatus capable of communicating in compliance with a communication mode supported by the management target device; and to forward the request data to the identified device agent apparatus to cause the identified device agent apparatus to transmit the request data to the management target device.

BRIEF DESCRIPTION OF THE DRAWINGS

FIG. 7 is a diagram illustrating an example of first mapping information stored in a mapping information storage unit of the remote management system according to the first embodiment of the present disclosure;

FIG. 8 is a diagram illustrating an example of second mapping information stored in the mapping information storage unit of the remote management system according to the first embodiment of the present disclosure;

FIG. 9 is a diagram illustrating an exemplary data structure of communication mode definition information stored in a communication mode definition information storage unit of the remote management system according to the first embodiment of the present disclosure;

FIG. 10 is a diagram illustrating an exemplary data structure of management target device information stored in a-management target device information storage unit of the remote management system according to the first embodiment of the present disclosure;

DESCRIPTION OF THE EMBODIMENTS

First Embodiment

In the following, a first embodiment of the present disclosure will be described with reference to the drawings.
<Overall Configuration of Remote Management System>

Figure 1:
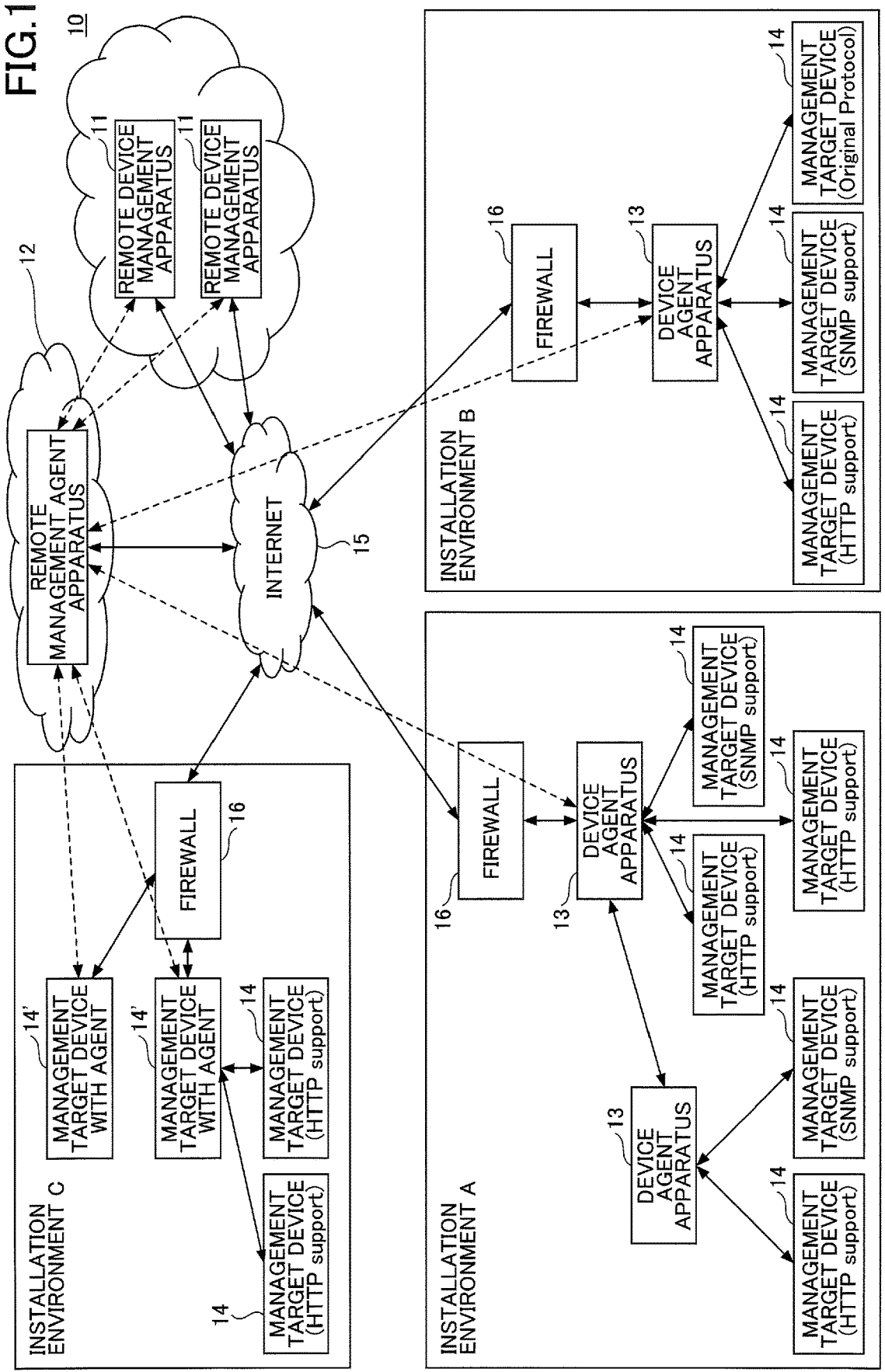
FIG. 1 is a view illustrating an overall configuration of a remote management system according to a first embodiment of the present disclosure.

FIG. 1 is a view illustrating an overall configuration of a remote management system 10 according to the first embodiment of the present disclosure. The remote management system 10 illustrated in FIG. 1 is configured such that multiple management target devices 14 provided in multiple installation environments A to C can be managed via the Internet 15 and a firewall 16 from a remote device management apparatus 11 that is located remotely.

As illustrated in FIG. 1, the remote management system 10 includes multiple remote device management apparatuses 11, a remote management agent apparatus 12, multiple device agent apparatuses 13, and multiple management target devices 14. Note that a management target device with agent 14' illustrated in FIG. 1 is a type of the management target device 14 configured by adding a function similar to the device agent apparatus 13 to the management target device 14.

The remote device management apparatus 11 is operated by a remote device administrator, and can monitor or operate the management target device 14 from a remote location. The remote device management apparatus 11 maintains device information and service definition information. The device information includes information concerning a management target device 14 to be managed by the remote device management apparatus 11. The service definition information includes information concerning a service provided by the remote device management apparatus 11.

The service definition information includes, for example, event information concerning an event such as a periodical health check event or a periodical information collection event, frequency information of an event, and definition of information which should be retrieved from the management target device 14. The service definition information also includes communication mode definition information which is used by a device agent apparatus 13 to communicate with a management target device 14.

Examples of the services provided by the remote device management apparatus 11 include a display of a device status used for remote maintenance, a display of an error state, an update of setting values of a device, a report of device usage, an acquisition of log information of a device for a developer of the device, a remote firmware update of a device, and an office management for managing air conditioning or lighting in an office. The remote device management apparatus 11 may provide a service coordinated with other Web services.

The remote management agent apparatus 12 mediates communication data between a remote device management apparatus 11 and a device agent apparatus 13. For example, when the remote management agent apparatus 12 receives request data targeted to a management target device 14 which is issued from a remote device management apparatus 11, the remote management agent apparatus 12 can forward the request data to a device agent apparatus 13 communicably coupled to the management target device 14. Also, when the remote management agent apparatus 12 receives response data output from the management target device 14 via the device agent apparatus 13, the remote management agent apparatus 12 can forward the response data to the remote device management apparatus 11.

In the present embodiment, HTTP (Hypertext Transfer protocol) is used for communication between the remote management agent apparatus 12 and the remote device management apparatus 11, and communication between the remote management agent apparatus 12 and the device agent apparatus 13. However, a communication protocol used for these communications is not limited to HTTP. Other communication protocols that can be used for these communications (such as WebSocket or MQTT) may be used.

A device agent apparatus 13, and a management target device 14 coupled to the device agent apparatus 13, are installed in the same local area network. In response to receiving request data transmitted via the Internet 15 and the firewall 16 from the remote management agent apparatus 12, the device agent apparatus 13 communicates with the management target device 14 in compliance with a communication mode supported by the management target device 14.

By performing communication, the device agent apparatus 13 transmits various request data (for example, an operation instruction such as changing a setting value, updating firmware, and tuning on/off power, or an acquisition request of information of a management target device 14, such as status information, setting value information, and log information) from a remote device management apparatus 11 to the management target device 14, and obtains various response data from the management target device 14.

For example, the device agent apparatus 13 establishes connection with the remote management agent apparatus 12 using a communication protocol such as HTTP, WebSocket or HTTP2. Note that the device agent apparatus 13 may not necessarily be embodied by a dedicated hardware. The device agent apparatus 13 may be embodied by software installed in other apparatuses (such as a server, a box appliance, or a management target device 14).

A communication path between the device agent apparatus 13 and the remote management agent apparatus 12 is not limited to a path via the Internet 15. Public wireless networks such as 3G or LTE may also be used in the communication path. In this case, the device agent apparatus 13 may connect to the remote management agent apparatus 12 via VPN from an access point of a communication carrier.

Further, when a new management target device 14 is added, information concerning a communication mode supported by the new management target device 14 (communication mode definition information) and communication setting information of the new management target device 14 (management target device information) are set/registered dynamically with the device agent apparatus 13. By referring to the communication mode definition information and the management target device information, the device agent apparatus 13 can communicate with the new management target device 14.

The management target device 14 is an electronic device equipped with a communication function, and is a target of management by a remote device management apparatus 11. Examples of the management target device 14 include an imaging device (such as a printer, a fax, a digital multifunction peripheral, or a scanner), a network-connected home appliance, office equipment (such as a projector or an electronic whiteboard), a vending machine, medical equipment, power supply equipment, air conditioning equipment, and metering equipment for gas, water, electricity, or the like. Each management target device 14 is equipped with a communication function using a specific communication protocol such as HTTP, SNMP, ICMP, MQTT, and the like. The communication protocol supported by each management target device 14 differs depending on a type of the management target device 14.

<Hardware Configuration of Each Apparatus in Remote Management System 10>

Figure 2:
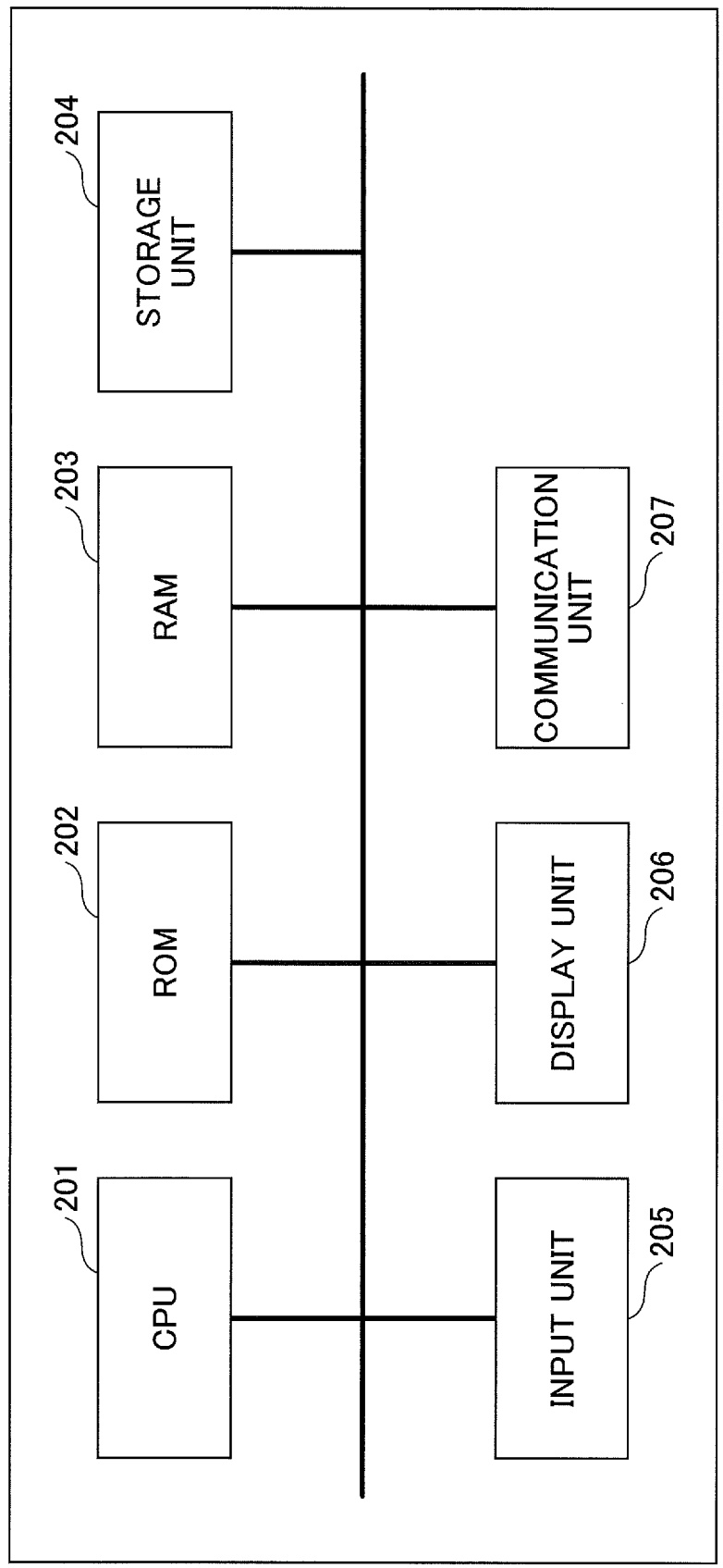
FIG. 2 is a view illustrating a hardware configuration of each apparatus in the remote management system according to the first embodiment of the present disclosure.

FIG. 2 is a view illustrating a hardware configuration of each apparatus in the remote management system 10 according to the first embodiment of the present disclosure. As illustrated in FIG. 2, each of the remote device management apparatus 11, the remote management agent apparatus 12, the device agent apparatus 13, and the management target device 14 includes a CPU (Central Processing Unit) 201, a ROM (Read Only Memory) 202, a RAM (Random Access Memory) 203, a storage unit 204, an input unit 205, a display unit 206, and a communication unit 207. These hardware elements are connected with each other via a bus.

The CPU 201 executes various programs stored in the ROM-202 or the storage unit 204. The ROM 202 is a non-volatile memory. The ROM 202 stores, for example, various programs to be executed by the CPU 201 and data necessary for the CPU 201 executing the various programs. The RAM 203 is a main memory device such as DRAM (Dynamic Random Access Memory) or SRAM (Static Random Access Memory). The RAM 203 is used, for example, as a work area when the CPU 201 executes various programs.

The storage unit 204 is a non-volatile storage device. The storage unit 204 stores, for example, various programs to be executed by the CPU 201 and data necessary for the CPU 201 executing the various programs. The input unit 205 is an interface used by an operator (a device administrator or the like) when inputting various instructions. The display unit 206 is a display device for displaying various information (such as various remote management screens rendered by the remote device management apparatus 11). The communication unit 207 is an interface used for communicating with other devices via a network.

The remote management agent apparatus 12, the device agent apparatus 13, and the management target device 14 are not required to include an input unit 205 and a display unit 206. However, the remote management agent apparatus 12, the device agent apparatus 13, and the management target device 14 may include an input unit 205 and a display unit 206, so that an operator can input various instructions depending on functions of each device.

<Functional Configuration of Each Apparatus in Remote Management System 10>

Figure 3:
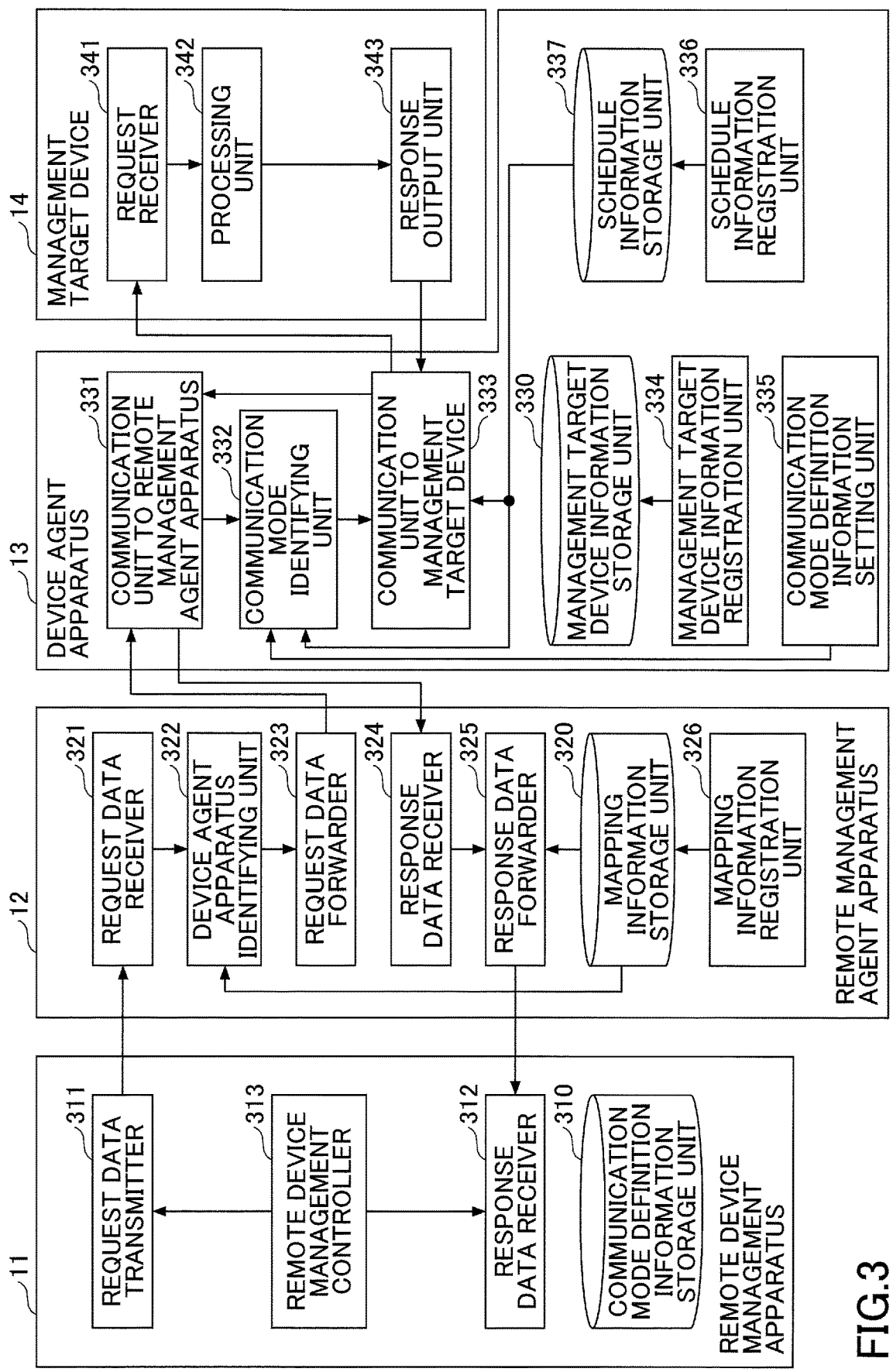
FIG. 3 is a view illustrating a functional configuration of each apparatus in the remote management system according to the first embodiment of the present disclosure.

FIG. 3 is a view illustrating a functional configuration of each apparatus in the remote management system 10 according to the first embodiment of the present disclosure.

<Function of Remote Device Management Apparatus 11>

As illustrated in FIG. 3, the remote device management apparatus 11 includes a communication mode definition information storage unit 310, a request data transmitter 311, a response data receiver 312, and a remote device management controller 313.

The communication mode definition information storage unit 310 stores communication mode definition information, in which a definition of a communication mode (such as a communication protocol and a communication port) used for a communication between a device agent apparatus 13 and a management target device 14 is described. Details of the communication mode definition information will be described below with reference to FIG. 9.

The request data transmitter 311 transmits request data targeted to a management target device 14 to the remote management agent apparatus 12. The response data receiver 312 receives response data which is sent out from a management target device 14 and is forwarded by the remote management agent apparatus 12.

The remote device management controller 313 controls overall remote management performed by the remote device management apparatus 11. When an operator inputs, to the remote device management apparatus 11, an instruction targeted to a certain management target device 14, the remote device management controller 313 causes the request data transmitter 311 to transmit request data to the management target device 14. In addition, when the response data receiver 312 receives response data from a management target device 14, the remote device management controller 313 performs, based on the response data, a process corresponding to the response data (for example, an error detection processing, a device controlling process in case of an error, and the like).

The remote device management controller 313 further performs information acquisition from a management target device 14, based on service definition information that is set to the remote device management apparatus 11 in advance. The service definition information includes, for example, identification information of a management target device 14 from which information is to be acquired, a type of information to be acquired, and an information acquisition frequency. The remote device management controller 313 can also generate and display various lists of information concerning management target devices 14 managed by the remote device management apparatus 11. Examples of the lists include: a list of the management target devices 14 in which an error occurred, a list of the management target devices 14 used by a certain customer, and the like.

<Function of Remote Management Agent Apparatus 12>

As illustrated in FIG. 3, the remote management agent apparatus 12 includes a mapping information storage unit 320, a request data receiver 321, a device agent apparatus identifying unit 322, a request data forwarder 323, a response data receiver 324, a response data forwarder 325, and a mapping information registration unit 326.

The mapping information storage unit 320 stores mapping information (also referred to as "first mapping information") representing a mapping between a management target device 14 and a device agent apparatus 13 (a device agent apparatus 13 capable of communicating in compliance with a communication mode-supported by the management target device 14). A specific example of the first mapping information will be described below with reference to FIG. 7. The mapping information storage unit 320 also stores mapping information (second mapping information) representing a mapping between a remote device management apparatus 11 and a device agent apparatus 13. A specific example of the second mapping information will be described below with reference to FIG. 8.

The request data receiver 321 receives request data which is targeted to a management target device 14, from a remote device management apparatus 11.

The device agent apparatus identifying unit 322 identifies a device agent apparatus 13 capable of communicating in compliance with a communication mode supported by a management target device 14. Specifically, the device agent apparatus identifying unit 322 refers to the first mapping information stored in the mapping information storage unit 320, and identifies, out of the first mapping information, a device agent apparatus 13 associated with a management target device 14 which is a destination of request data, as the device agent apparatus 13 capable of communicating in compliance-with a communication mode supported by the management target device 14.

The request data forwarder 323 forwards request data received by the request data receiver 321 to a device agent apparatus 13 identified by the device agent apparatus identifying unit 322.

The response data receiver 324 receives response data sent from a management target device 14 via a device agent apparatus 13.

The response data forwarder 325 sends response data received by the response data receiver 324 to a remote device management apparatus 11. In sending the response data, the response data forwarder 325 refers to the second mapping information stored in the mapping information storage unit 320 to identify a remote device management apparatus 11 associated with the device agent apparatus 13 via which the response data is sent, and determines the identified remote device management apparatus 11 as a destination of the response data.

When a new management target device 14 is added, the mapping information registration unit 326 adds, to the first mapping information stored in the mapping information storage unit 320, information representing a mapping between the new management target device 14 and the device agent apparatus 13 capable of communicating with the new management target device 14.

<Function of Device Agent Apparatus 13>

As illustrated in FIG. 3, the device agent apparatus 13 includes a management target device information storage unit 330, a communication unit to remote management agent apparatus 331, a communication mode identifying unit 332, a communication unit to management target device 333, a management target device information registration unit 334, a communication mode definition information setting unit 335, a schedule information registration unit 336, and a schedule information storage unit 337.

The management target device information storage unit 330 stores management target device information including communication setting information for a management target device 14 managed by the device agent apparatus 13. Details of the management target device information will be described below with reference to FIG. 10.

The communication unit to remote management agent apparatus 331 performs communication with the remote management agent apparatus 12. The communication unit to remote management agent apparatus 331 receives request data sent from the remote management agent apparatus 12, and transmits response data, received from a management target device 14 by the communication unit to management target device 333, to the remote management agent apparatus 12. In the present embodiment, HTTP is used for communication with the remote management agent apparatus 12, by the communication unit to remote management agent apparatus 331. However, other communication protocols such as WebSocket or HTTP2 may be used, instead of (or in addition to) HTTP.

The communication mode identifying unit 332 identifies a communication mode and a communication setting used for communication with a management target device 14. Specifically, the communication mode identifying unit 332 identifies the communication mode and the communication setting used for the communication with a management target device 14, based on the communication mode definition information set to the device agent apparatus 13 by the communication mode definition information setting unit 335, and based on the management target device information registered with the management target device information storage unit 330 by the management target device information registration unit 334.

The communication unit to management target device 333 performs communication with a management target device 14 using the communication mode and the communication setting identified by the communication mode identifying unit 332. Based on the communication mode and the communication setting identified by the communication mode identifying unit 332, the communication unit to management target device 333 sends request data received by the communication unit to remote management agent apparatus 331, to the management target device 14. Further, the communication unit to management target device 333 receives response data output by the management target device 14.

When a new management target device 14 is added, the management target device information registration unit 334 adds the management target device information concerning the new management target device 14 to the management target device information storage unit 330, in response to a request from a remote device management apparatus 11.

When a new management target device 14 is added, the communication mode definition information setting unit 335 sets the communication mode definition information concerning the new management target device 14 to the device agent apparatus 13, in response to a request from a remote device management apparatus 11.

The schedule information registration unit 336 registers schedule execution information with the schedule information storage unit 337. The schedule information storage unit 337 stores the schedule execution information registered by the schedule information registration unit 336. Specifically, when the device agent apparatus 13 receives a registration request of schedule execution information from a remote device management apparatus 11, the schedule information registration unit 336 in the device agent apparatus 13 registers the schedule execution information with the schedule information storage unit 337.

For example, the following information is recorded in the schedule execution information:

Schedule execution: Effective/Ineffective

Schedule definition: Information collection, health check, and the like.

Schedule execution timing: Once a day/once a week/once a month/periodical

Schedule execution time (This is set when the schedule execution timing is once a day, once a week, or once a month)

Schedule execution frequency (This is set when the schedule execution timing is periodical)

Suppose a case in which the "Schedule execution" is set to "Effective". In this case, when a time to perform schedule execution arrives, specified with a set of "Schedule execution timing" and "Schedule execution time" (or a set of "Schedule execution timing" and "Schedule execution frequency"), the communication mode identifying unit 332 first identifies a communication mode and a communication setting used for communication with a management target device 14. Subsequently, the communication unit to management target device 333 performs communication with the management target device 14 using the communication mode and the communication setting identified by the communication mode identifying unit 332. Based on the communication, the communication unit to management target device 333 performs a process defined in the "Schedule definition" (such as information collection or health check) to the management target device 14. When the communication unit to management target device 333 receives a processing result from the management target device 14, the communication unit to management target device 333 sends the processing result to a remote device management apparatus 11 via the remote management agent apparatus 12.

The device agent apparatus 13 executes the above series of processes for each time specified with a set of "Schedule execution timing" and "Schedule execution time" (or a set of "Schedule execution timing" and "Schedule execution frequency"). Therefore, after the schedule execution information is registered with the device agent apparatus 13, the remote device management apparatus 11 can obtain information concerning the management target device 14 periodically.

<Function of Management Target Device 14>

As illustrated in FIG. 3, the management target device 14 includes a request receiver 341, a processing unit 342, and a response output unit 343.

The request receiver 341 receives a request from a remote device management apparatus 11 by receiving request data from a device agent apparatus 13.

The processing unit 342 performs various processes in response to a request from a remote device management apparatus 11 received by the request receiver 341. The processing unit 342 performs, for example, a process for operating the management target device 14 (where the processing unit 342 resides), such as changing a setting value, updating firmware, or turning on/off power. The processing unit 342 also performs, for example, a process for outputting various types of information (such as a state, a setting value, or log information of the management target device 14).

The response output unit 343 outputs response data, which is generated based on a result of a process by the processing unit 342, to the device agent apparatus 13.

The above described functions of the remote management system 10 are embodied by hardware (see FIG. 2) included in the remote device management apparatus 11, the remote management agent apparatus 12, the device agent apparatus 13, and the management target device 14. Specifically, the communication mode definition information storage unit 310, the mapping information storage unit 320, and the management target device information storage unit 330 are embodied by a storage unit 204. Other functions are embodied by a CPU 201 executing program(s) stored in a ROM 202 or a storage unit 204.

The program(s) may be provided to a user in a state installed in the remote device management apparatus 11, the remote management agent apparatus 12, the device agent apparatus 13, or the management target device 14. Alternatively, the program(s) may be supplied from outside the remote management system 10, and be installed into the remote device management apparatus 11, the remote management agent apparatus 12, the device agent apparatus 13, or the management target device 14. In the latter case, the program(s) may be provided by distributing an external storage device (such as a USB memory, a memory card, or a CD-ROM) in which the program(s) is/are installed. Alternatively, the program(s) may be provided by storing in a server on a network (such as the Internet) in a downloadable state.

<Flow of Remote Management Process in Remote Management System 10>

Figure 4:
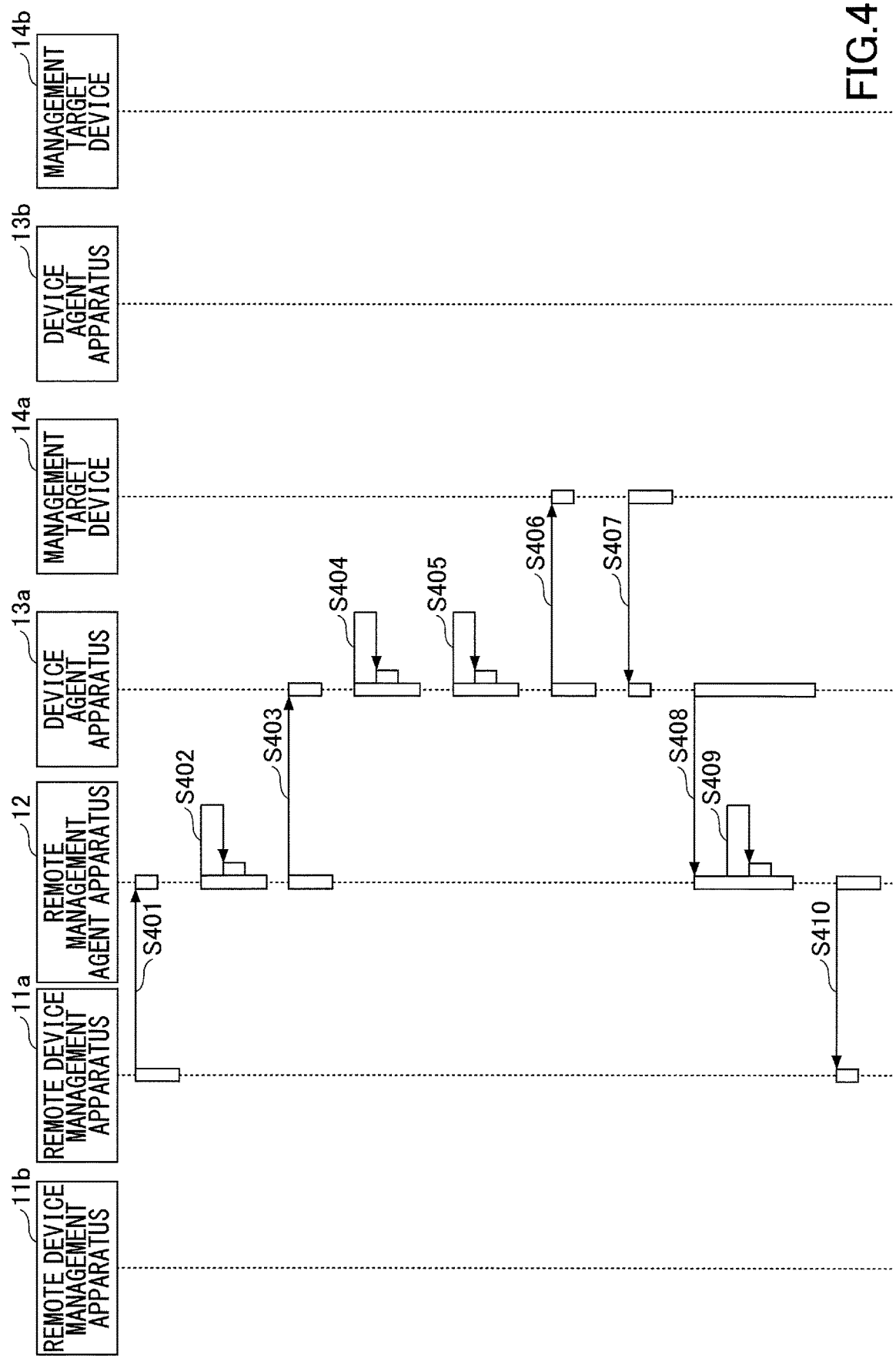
FIG. 4 is a sequence diagram illustrating a flow of a remote management process performed in the remote management system according to the first embodiment of the present disclosure.

FIG. 4 is a sequence diagram illustrating a flow of a remote management process performed in the remote management system 10 according to the first embodiment of the present disclosure. The process illustrated in FIG. 4 is started, for example, when a device administrator inputs, to a remote device management apparatus 11, an instruction targeted to a management target device 14. Alternatively for example, the process may be started periodically based on the service definition information maintained by the remote device management apparatus 11.

Note that FIG. 4 describes an example in which a remote device management apparatus 11a obtains information from a management target device 14a by sending an information acquisition request (an example of request data) to the management target device 14a.

Also in this example, suppose a case that the following information is stored in the communication mode definition information storage unit 310 and the mapping information storage unit 320. In the communication mode definition information stored in the communication mode definition information storage unit 310, "SNMP" is recorded as a communication mode supported by the management target device 14a. Further, in the first mapping information stored in the mapping information storage unit 320, "device agent apparatus 13a" is recorded as a device agent apparatus 13 associated with the management target device 14a. Further, in the second mapping information stored in the mapping information storage unit 320, "remote device management apparatus 11a" is recorded as a remote device management apparatus 11 associated with the device agent apparatus 13a.

First, the request data transmitter 311 in the remote device management apparatus 11a sends, to the remote management agent apparatus 12, an information acquisition request targeted to the management target device 14a (step S401).

When the request data receiver 321 in the remote management agent apparatus 12 receives the information acquisition request, the device agent apparatus identifying unit 322 identifies a device agent apparatus 13 associated with the management target device 14a, based on the first mapping information stored in the mapping information storage unit 320 (step S402). In the example illustrated in FIG. 4, "device agent apparatus 13a" is identified as a device agent apparatus 13 associated with the management target device 14a.

Next, the request data forwarder 323 forwards the information acquisition request to the device agent apparatus 13a (step S403).

In the device agent apparatus 13a, when the communication unit to remote management agent apparatus 331 receives the information acquisition request, the communication mode identifying unit 332 identifies the management target device 14a as an information acquisition target, based on identification information designated by the information acquisition request (step S404). The communication mode identifying unit 332 further identifies a communication mode and a communication setting used for communication with the management target device 14a, based on the identification information of the management target device 14a, the communication mode definition information, and the management target device information (step S405).

In the example illustrated in FIG. 4, "SNMP" is identified as the communication mode used for the communication with the management target device 14a. Next, by performing communication in compliance with the communication mode (SNMP) and the communication setting identified at step S404, the communication unit to management target device 333 sends the information acquisition request to the management target device 14a (step S406).

When the request receiver 341 receives the information acquisition request in the management target device 14a, the processing unit 342 performs a process for extracting information according to the information acquisition request, and the response output unit 343 outputs, as response data, the extracted information to the device agent apparatus 13a (step S407).

In the device agent apparatus 13a, when the communication unit to management target device 333 receives the response data output by the management target device 14a, the communication unit to remote management agent apparatus 331 sends the response data to the remote management agent apparatus 12 (step S408).

When the remote management agent apparatus 12 receives the response data sent from the device agent apparatus 13a, the remote management agent apparatus 12 identifies, based on identification information of the device agent apparatus 13a designated by the response data, and based on the second mapping information stored in the mapping information storage unit 320, the remote device management apparatus 11a as a destination where the response data is to be forwarded (step S409).

Next, the response data forwarder 325 forwards the response data to the remote device management apparatus 11a (step S410). When the response data receiver 312 receives the response data in the remote device management apparatus 11a, the remote management system 10 terminates the series of the processes illustrated in FIG. 4.

<Flow of Device Agent Apparatus Setting Process Performed in Remote Management System 10>

Figure 5:
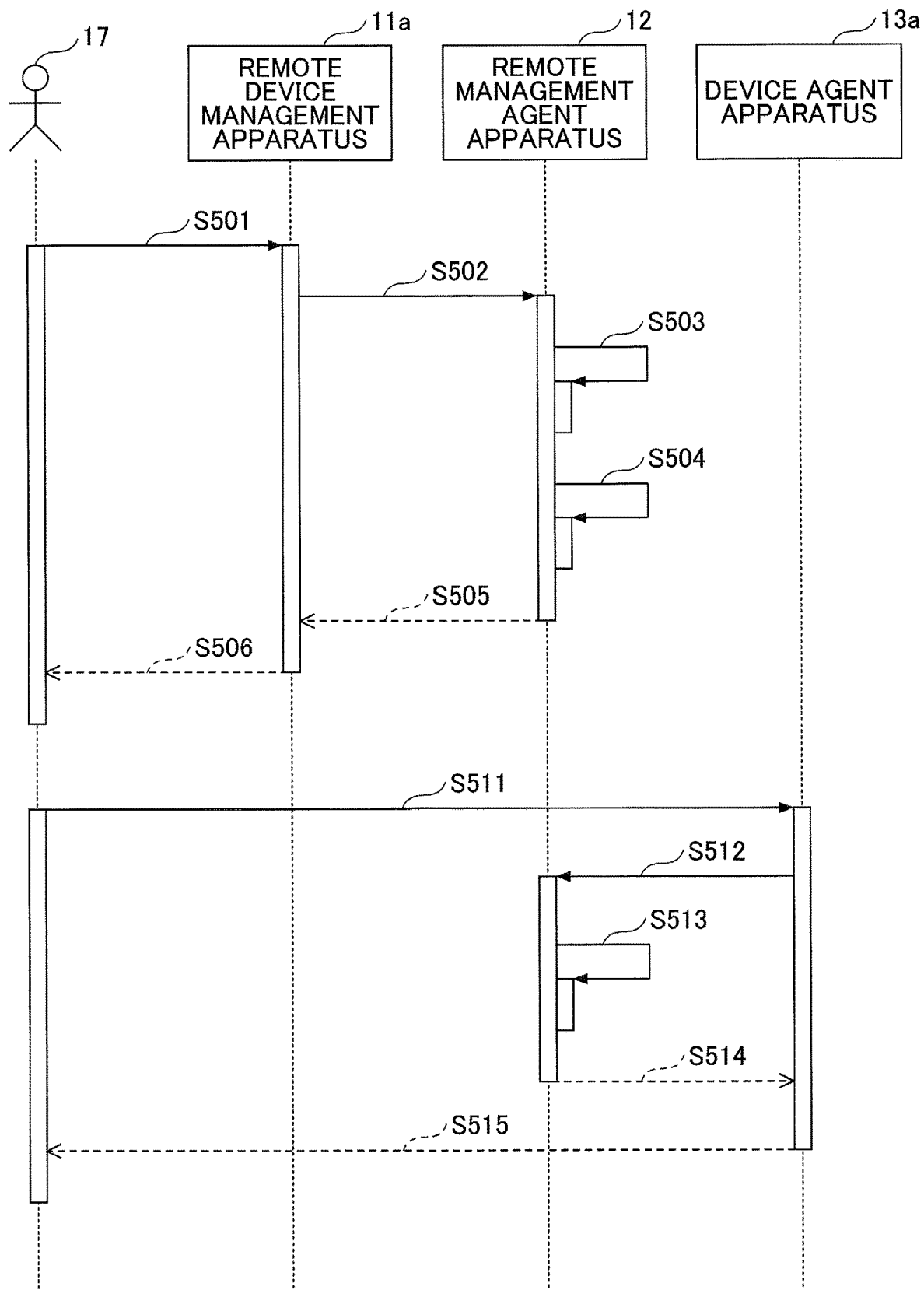
FIG. 5 is a sequence diagram illustrating a flow of a device agent apparatus setting process performed in the remote management system according to the first embodiment of the present disclosure.

FIG. 5 is a sequence diagram illustrating a flow of a device agent apparatus setting process performed in the remote management system 10 according to the first embodiment of the present disclosure. In the following, a case is described in which the remote device management apparatus 11a is associated with the device agent apparatus 13a, and the association (mapping) is registered with the second mapping information in the mapping information storage unit 320 of the remote management agent apparatus 12.

First, a device administrator 17 inputs an instruction for issuing a registration number to the remote device management apparatus 11a (step S501). In response to the input, the remote device management apparatus 11a sends a request for issuing a registration number to the remote management agent apparatus 12 (step S502).

When the remote management agent apparatus 12 receives the request for issuing a registration number, the remote management agent apparatus 12 issues a registration number (step S503). In the example described here, suppose a case in which "112233" was issued as the registration number at step S503. After step S503, the remote management agent apparatus 12 associates the remote device management apparatus 11a with the issued registration number "112233" (step S504).

Next, the remote management agent apparatus 12 sends (notification of) the issued registration number "112233" to the remote device management apparatus 11a (step S505). Further, the remote device management apparatus 11a sends (notification of) the issued registration number "112233" to the device administrator 17 (step S506).

Next, the device administrator 17 inputs the registration number "112233" to the device agent apparatus 13a (step S511). In response to the input, the device agent apparatus 13a sends (notification of) the input registration number "112233" and an identifier of the device agent apparatus 13a to the remote management agent apparatus 12 (step S512).

In response to receiving the notification, the remote management agent apparatus 12 associates an identifier of the remote device management apparatus 11a that is associated with the notified registration number "112233", with the notified identifier of the device agent apparatus 13a, and stores information about the association into the second mapping information in the mapping information storage unit 320 of the remote management agent apparatus 12 (step S513).

Next, the remote management agent apparatus 12 sends a notification indicating a completion of a second mapping information registration to the device agent apparatus 13a (step S514). The device agent apparatus 13a sends (notification of) a result of the second mapping information registration, to the remote device management apparatus 11a (step S515).

<Flow of Management Target Device Adding Process in Remote Management System 10>

Figure 6:
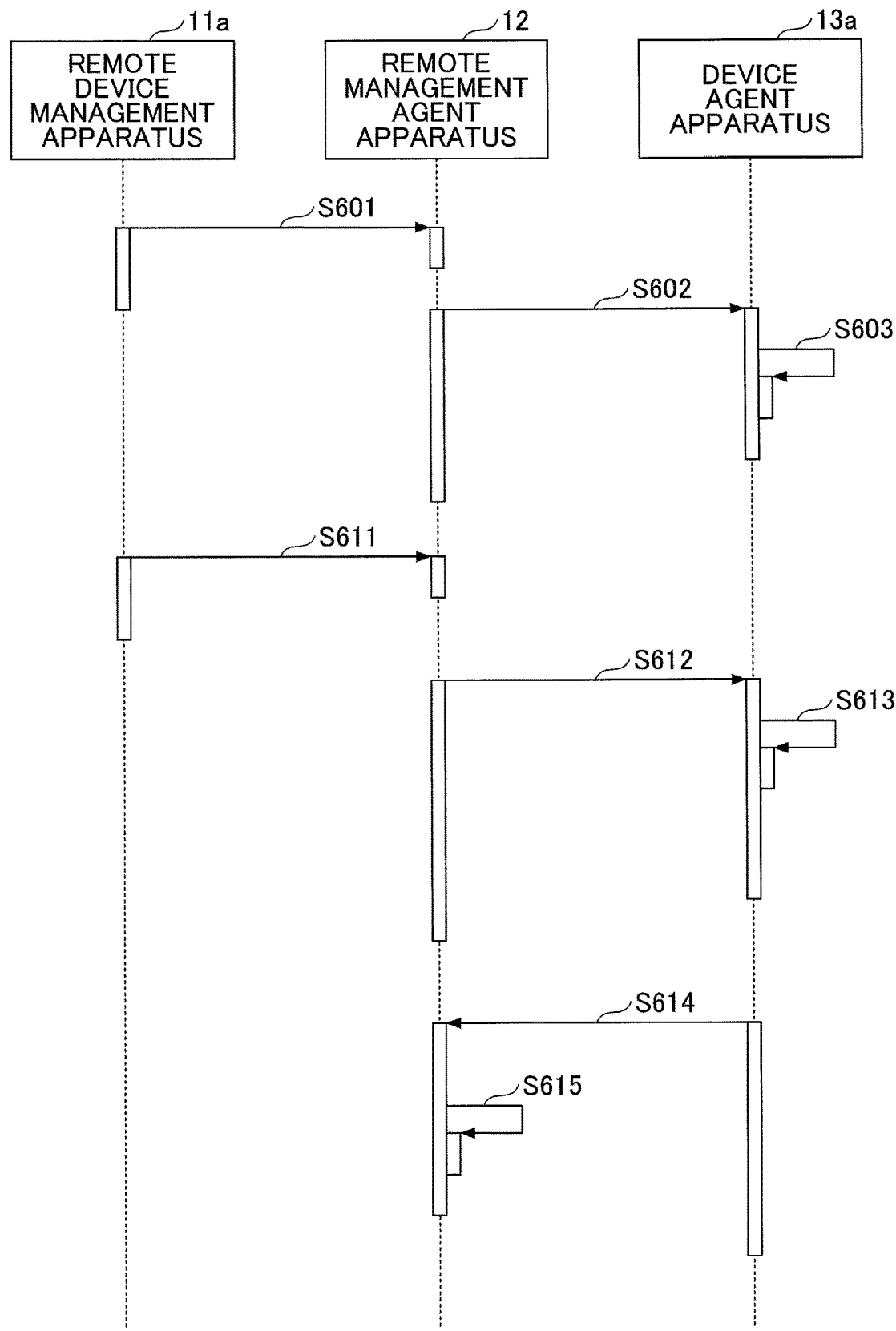
FIG. 6 is a sequence diagram illustrating a flow of a management target device adding process performed in the remote management system according to the first embodiment of the present disclosure.

FIG. 6 is a sequence diagram illustrating a flow of a management target device adding process performed in the remote management system 10 according to the first embodiment of the present disclosure. The following describes a case in which, in response to a new addition of a management target device 14a to the remote management system 10, communication mode definition information and management target device information concerning the management target device 14a are added to the device agent apparatus 13a.

First, the remote device management apparatus 11a sends, to the remote management agent apparatus 12, a request for setting communication mode definition information concerning the management target device 14a (step S601). When the remote management agent apparatus 12 receives the request for setting the communication mode definition information concerning the management target device 14a, the remote management agent apparatus 12 forwards the request to the device agent apparatus 13a (step S602).

When the device agent apparatus 13a receives the request for setting the communication mode definition information concerning the management target device 14a, the communication mode definition information setting unit 335 sets the communication mode definition information concerning the management target device 14a to the device agent apparatus 13a (step S603).

Next, the remote device management apparatus 11a sends, to the remote management agent apparatus 12, a request for adding management target device information concerning the management target device 14a (step S611). When the remote management agent apparatus 12 receives the request for adding the management target device information concerning the management target device 14a, the remote management agent apparatus 12 forwards the request to the device agent apparatus 13a (step S612).

When the device agent apparatus 13a receives the request for adding the management target device information concerning the management target device 14a, the management target device information registration unit 334 additionally registers the management target device information concerning the management target device 14a with the management target device information storage unit 330 (step S613). Next, the device agent apparatus 13a sends a notification indicating a registration completion of the management target device information to the remote management agent apparatus 12 (step S614). When the remote management agent apparatus 12 receives the notification, the mapping information registration unit 326 adds the association (mapping) of the management target device 14a with the device agent apparatus 13a to the first mapping information stored in the mapping information storage unit 320 (step S615).

<Example of First Mapping Information>

FIG. 7 is a diagram illustrating an example of the first mapping information stored in the mapping information storage unit 320 of the remote management system 10 according to the first embodiment of the present disclosure. As illustrated in FIG. 7, a mapping between a management target device 14 and a device agent apparatus 13 (a device agent apparatus 13 capable of communicating in compliance with a communication mode supported by the management target device 14) is recorded in the first mapping information.

The first mapping information is stored in the mapping information storage unit 320 of the remote management agent apparatus 12. The first mapping information is referenced when the device agent apparatus identifying unit 322 in the remote management agent apparatus 12 identifies a device agent apparatus 13 used for communicating with a management target device 14. For example, if an identifier of a management target device 14, included in request data as a destination of the request data, is "Device333333", the device agent apparatus identifying unit 322 identifies a device agent apparatus 13 having an identifier "Gateway12345" as a device agent apparatus 13 used for communicating with the management target device 14, based on the first mapping information illustrated in FIG. 7.

<Example of Second Mapping Information>

FIG. 8 is a diagram illustrating an example of the second mapping information stored in the mapping information storage unit 320 of the remote management system 10 according to the first embodiment of the present disclosure. As illustrated in FIG. 8, a mapping between a remote device management apparatus 11 and a device agent apparatus 13 is recorded in the second mapping information.

The second mapping information is stored in the mapping information storage unit 320 of the remote management agent apparatus 12. The second mapping information is referenced when the response data forwarder 325 in the remote management agent apparatus 12 identifies a remote device management apparatus 11 to which response data received from a device agent apparatus 13 is to be forwarded. For example, if an identifier of a device agent apparatus 13, included in response data as a destination, is "Gateway12345", the response data forwarder 325 identifies a remote device management apparatus 11 having an identifier "Application_a" as a remote device management apparatus 11 to which the response data is to be forwarded, based on the second mapping information illustrated in FIG. 8.

<Data Structure of Communication Mode Definition Information>

FIG. 9 is a diagram illustrating an exemplary data structure of the communication mode definition information stored in the communication mode definition information storage unit 310 of the remote management system 10 according to the first embodiment of the present disclosure. In the communication mode definition information, a definition of a communication mode supported by a management target device 14 is recorded.

In the example of the communication mode definition information illustrated in FIG. 9, the communication mode definition information includes data items of "Protocol Type", "Supported Device Type", "Communication Port", and "Detailed Definition of Communication Protocol".

The "Protocol Type" stores information for identifying a communication protocol supported by a management target device 14, such as HTTP, SNMP, ICMP, or MQTT. The "Supported Device Type" stores a type of a management target device 14, supporting the communication mode (protocol). The "Communication Port" stores information about communication port, such as "80/tcp", which is used for communication with a management target device 14. The "Detailed Definition of Communication Protocol" stores a detailed definition of the communication protocol.

When a management target device 14 is newly added, the communication mode definition information having the data structure described here is set to a device agent apparatus 13 capable of communicating with the added management target device 14, in response to a request from a remote device management apparatus 11. By the communication mode definition information, the device agent apparatus 13 can identify a communication mode to be used for communicating with the management target device 14.

<Data Structure of Management Target Device Information>

FIG. 10 is a diagram illustrating an exemplary data structure of the management target device information stored in the management target device information storage unit 330 of the remote management system 10 according to the first embodiment of the present disclosure. In the management target device information, communication setting information concerning a management target device 14 is stored.

In the example of the management target device information illustrated in FIG. 10, the management target device information includes data items of "Device Identifier", "Device Type", "IP Address", and "Additional Information".

The "Device Identifier" stores identification information for uniquely identifying a management target device 14. An example of information that can be used for the identification information is a MAC address. The "Device Type" stores information representing a type of the management target device 14. This information is used for matching the management target device 14 with the communication mode definition information. The "IP Address" stores an IP address of the management target device 14. The "Additional Information" stores information concerning a monitoring interval, a network interface used for communication, and the like.

When a management target device 14 is newly added, the management target device information having the data structure described here is additionally registered with the management target device information storage unit 330 in a device agent apparatus 13 capable of communicating with the added management target device 14, in response to a request from a remote device management apparatus 11. By the management target device information, the device agent apparatus 13 can identify a communication setting to be used for communicating with the management target device 14.

<Flow of Schedule Execution Process in Remote Management System 10>

Figure 11:
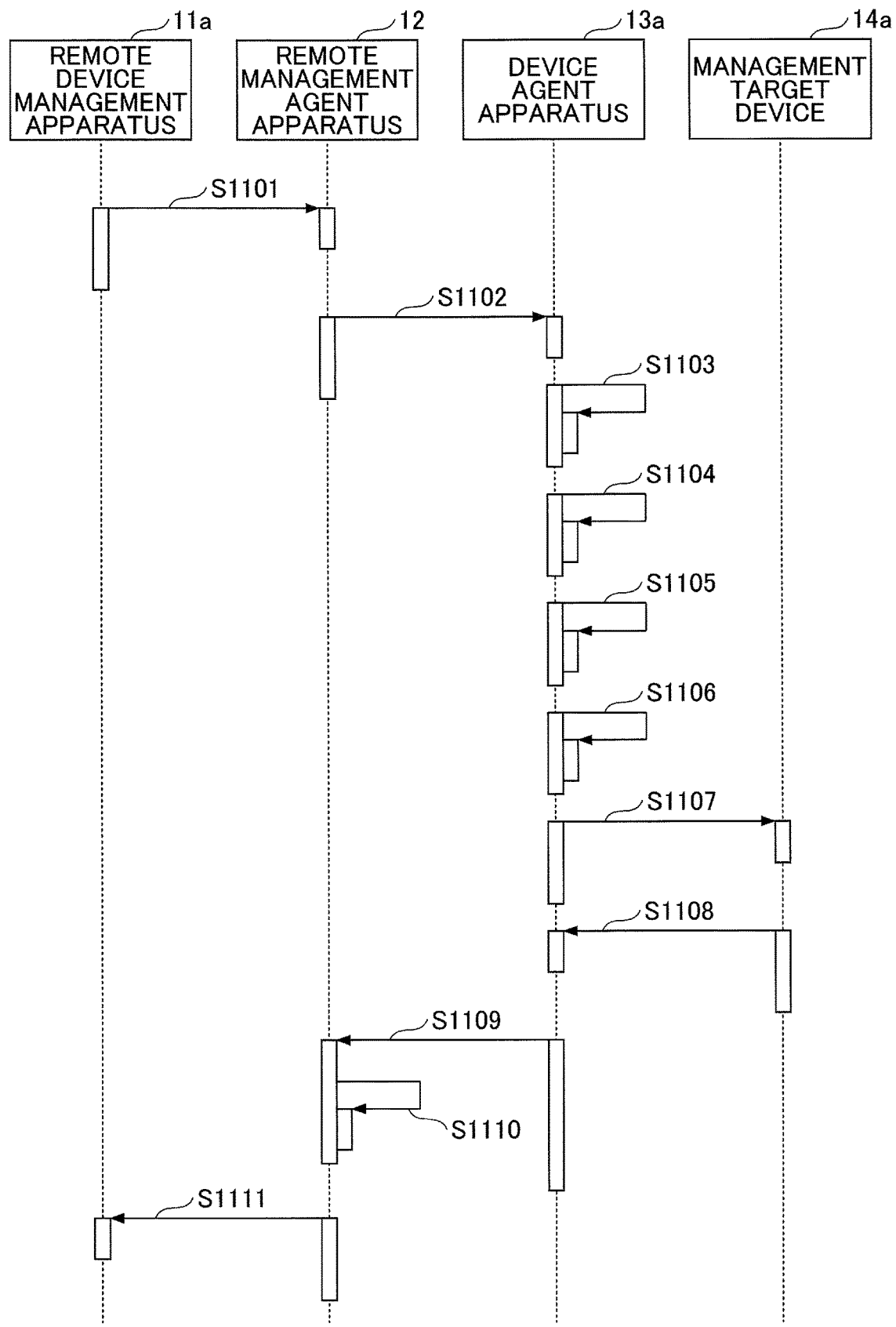
FIG. 11 is a sequence diagram illustrating a flow of a schedule execution process performed in the remote management system according to the first embodiment of the present disclosure.

FIG. 11 is a sequence diagram illustrating a flow of a schedule execution process performed in the remote management system 10 according to the first embodiment of the present disclosure. In the following, an example of processes for registering schedule execution information from a remote device management apparatus 11a with a device agent apparatus 13a, for periodically acquiring information about a management target device 14a by the device agent apparatus 13a, and for providing the acquired information to the remote device management apparatus 11a, will be described.

First, the remote device management apparatus 11a sends a request for registering schedule execution information to the remote management agent apparatus 12 (step S1101). The schedule execution information is entered to the remote device management apparatus 11a by the device administrator 17 (see FIG. 5). When the remote management agent apparatus 12 receives the request for registering the schedule execution information, the remote management agent apparatus 12 forwards the request to the device agent apparatus 13a (step S1102). When the device agent apparatus 13a receives the request for registering the schedule execution information, the schedule information registration unit 336 registers the schedule execution information with the schedule information storage unit 337 (step S1103).

Thereafter, when the device agent apparatus 13a detects an instance of time to perform schedule execution, which is set in the schedule execution information (step S1104), the communication mode identifying unit 332 identifies a management target device 14 from which information is to be acquired (the management target device 14a is identified in the example described here) (step S1105). Next, the communication mode identifying unit 332 identifies a communication mode and a communication setting that are used for communication with the management target device 14a, based on the identification information of the management target device 14a, the communication mode definition information, and the management target device information (step S1106). In the example illustrated in FIG. 11, as the communication mode used for the communication with the management target device 14a, "SNMP" is identified.

Next, by performing communication in compliance with the communication mode and the communication setting identified at step S1106, the communication unit to management target device 333 sends an information acquisition request to the management target device 14a (step S1107).

When the request receiver 341 receives the information acquisition request in the management target device 14a, the processing unit 342 performs a process for extracting information according to the information acquisition request, and the response output unit 343 outputs the extracted information to the device agent apparatus 13a as response data (step S1108).

In the device agent apparatus 13a, when the communication unit to management target device 333 receives the response data output from the management target device 14a, the communication unit to remote management agent apparatus 331 sends the response data to the remote management agent apparatus 12 (step S1109).

When the remote management agent apparatus 12 receives the response data sent from the device agent apparatus 13a, the remote management agent apparatus 12 identifies the remote device management apparatus 11a as a destination where the response data is to be forwarded, based on identification information of the device agent apparatus 13a designated by the response data, and based on the second mapping information stored in the mapping information storage unit 320 (step S1110).

Next, the response data forwarder 325 forwards the response data to the remote device management apparatus 11a (step S1111). When the response data receiver 312 receives the response data in the remote device management apparatus 11a, the remote management system 10 terminates the series of the processes illustrated in FIG. 11.

It should be noted that the remote management system 10 executes the above processes from steps S1104 to S1111 at every instance of time to perform schedule execution recorded in the schedule execution information. Therefore, the remote device management apparatus 11a can acquire information about the management target device 14a periodically, without sending an information acquisition request.

As described above, in the remote management system 10 according to the first embodiment of the present disclosure, the remote management agent apparatus 12 identifies a device agent apparatus 13 capable of communicating in compliance with a communication mode supported by a management target device 14, and forwards request data from a remote device management apparatus 11 to the identified device agent apparatus 13.

Accordingly, in a case in which a new electronic device is added as a management target device 14 in the remote management system 10, by only performing a setting such that the remote management agent apparatus 12 can identify a device agent apparatus 13 communicable with the management target device 14, the remote management system 10 will be able to manage the management target device 14 remotely. Hence, according to the remote management system 10, various electronic devices each supporting different types of communication modes can be easily added as management target devices.

Especially, the remote management system 10 identifies a device agent apparatus 13 capable of communicating with a management target device 14, by referring to the first mapping information storing a mapping between the management target device 14 and the device agent apparatus 13. Therefore, according to the remote management system 10, in a case in which a new electronic device is added as a management target device 14 in the remote management system 10, by only performing a simple setting to add the mapping between the management target device 14 and the device agent apparatus 13 to the first mapping information, the remote management system 10 will be able to manage the management target device 14 remotely.

Further in the remote management system 10, the remote management agent apparatus 12 refers to the second mapping information storing a mapping (association) between a device agent apparatus 13 and a remote device management apparatus 11, to identify a remote device management apparatus 11 associated with a device agent apparatus 13 from which response data is sent, and determines the identified remote device management apparatus 11 as a remote device management apparatus 11 to which response data is to be forwarded. Therefore, even when multiple remote device management apparatuses 11 are present, the remote management system 10 can easily and securely identify a remote device management apparatus 11 to which response data, which is output from a management target device 14, is to be forwarded.

Further in the remote management system 10, a device agent apparatus 13 identifies a communication mode supported by a management target device 14, by referring to communication mode definition information, and performs communication with the management target device 14 in compliance with the identified communication mode. Therefore, according to the remote management system 10, when a new electronic device is added as a management target device 14 in the remote management system 10, by only setting a communication mode supported by the management target device 14 to the communication mode definition information, a device agent apparatus 13 can communicate with the management target device 14 in compliance with the appropriate communication mode.

Further in the remote management system 10, when a management target device 14 is newly added, communication mode definition information concerning the management target device 14 and management target device information storing communication setting information of the management target device 14 are set/registered dynamically with a device agent apparatus 13. Therefore, according to the remote management system 10, a device agent apparatus 13 can use the communication mode definition information and the management target device information without setting the communication mode definition information and the management target device information to the device agent apparatus 13 by a system administrator manually.

In the first embodiment described above, it should be noted that functions of the remote management agent apparatus 12 may be embodied by a physically single apparatus, or by multiple physical apparatuses. For example, some of the functions of the remote management agent apparatus 12 may reside in a device outside the remote management agent apparatus 12.

Similarly in the first embodiment described above, functions of the device agent apparatus 13 may be embodied by a physically single apparatus, or by multiple physical apparatuses. For example, some of the functions of the device agent apparatus 13 may reside in a device outside the device agent apparatus 13.

Second Embodiment

Figure 12:
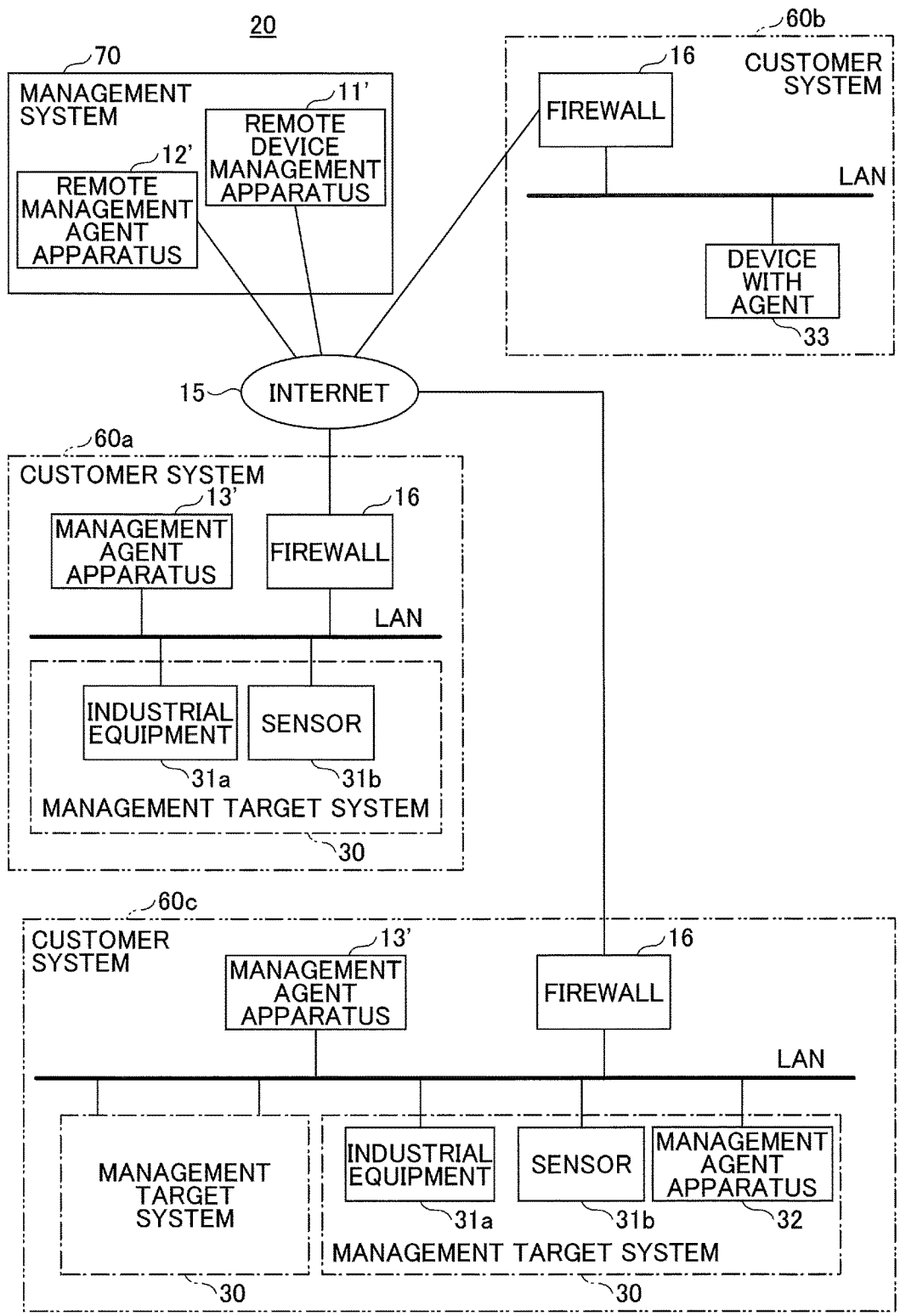
FIG. 12 is a view illustrating an overall configuration of an industrial equipment management system according to a second embodiment of the present disclosure.

In the following, a second embodiment of the present disclosure will be described with reference to FIG. 12. The second embodiment describes a case in which a target of application is an industrial equipment management system. FIG. 12 is a view illustrating an overall configuration of an industrial equipment management system 20 according to the second embodiment of the present disclosure. The industrial equipment management system 20 is an example of a "remote management system" described in the claims.

As illustrated in FIG. 12, the industrial equipment management system 20 according to the second embodiment includes customer systems 60a, 60b, and 60c, and a management system 70. The customer systems 60a, 60b, and 60c, and the management system 70 are all connected to the Internet 15. Especially, each of the customer systems 60a, 60b, and 60c is connected to the Internet 15 via a firewall 16 provided in each of the customer systems 60a, 60b, and 60c.

The customer system 60a is installed in a site of a customer. The customer system 60a includes a management agent apparatus 13', a management target system 30, and a firewall 16. The management target system 30 is a target of remote management by the management system 70.

FIG. 12 illustrates a case in which the management target system 30 includes industrial equipment 31a and a sensor 31b. The industrial equipment 31a and the sensor 31b are examples of a "management target device" in the claims, and have functions similar to the functions in the management target device 14 described in the first embodiment. Examples of the industrial equipment 31a include a processing machine, a conveyer, and an inspection machine. Examples of the sensor 31b include an image capturing device and a sound collecting device.

The management agent apparatus 13' is an example of a "device agent apparatus" in the claims, and have functions similar to the functions in the device agent apparatus 13 described in the first embodiment. The management agent apparatus 13' is connected to the management target system 30 and the firewall 16 via a LAN (Local Area Network). The management agent apparatus 13' includes a firmware update function to update firmware, installed in the industrial equipment 31a or the sensor 31b, using an Internet connection.

The customer system 60b is installed in another customer's site. The customer system 60b includes a device with agent 33 and a firewall 16. The device with agent 33 is a target of remote management by the management system 70. The device with agent 33 is an example of a "management target device" and a "device agent apparatus" in the claims, and have functions similar to the functions in the management target device 14 and the device agent apparatus 13 described in the first embodiment.

Examples of the device with agent 33 include industrial equipment (such as a processing machine, a conveyer, and an inspection machine), and a sensor (such as an image capturing device and a sound collecting device). The device with agent 33 is connected to the firewall 16 via a LAN. The device with agent 33 includes a firmware update function to update firmware, installed in the device with agent 33, using an Internet connection.

The customer system 60c is installed in yet another customer's site. The customer system 60c includes a management agent apparatus 13', multiple management target systems 30, and a firewall 16. Each of the management target systems 30 is a target of remote management by the management system 70.

FIG. 12 illustrates a case in which at least one of the management target systems 30 includes industrial equipment 31a, a sensor 31b, and a management agent apparatus 32. The industrial equipment 31a and the sensor 31b are examples of a "management target device" in the claims, and have functions similar to the functions in the management target device 14 described in the first embodiment. Examples of the industrial equipment 31a include a processing machine, a conveyer, and an inspection machine. Examples of the sensor 31b include an image capturing device and a sound collecting device.

The management agent apparatuses 13' and 32 are examples of a "device agent apparatus" in the claims, and have functions similar to the functions in the device agent apparatus 13 described in the first embodiment. The management agent apparatuses 13' and 32 are connected to the management target systems 30 and the firewall 16 via a LAN. The management agent apparatuses 13' and 32 include a firmware update function to update firmware, installed in the industrial equipment 31a or the sensor 31b, using an Internet connection.

In the customer system 60c, to alleviate workload increase of the management agent apparatus 13', the management agent apparatus 32 is additionally provided. An update of firmware of the industrial equipment 31a or the sensor 31b in the management target system 30 is performed by the management agent apparatus 32. The management agent apparatus 13' performs a function to centrally perform remote management of multiple management target systems 30 using an Internet connection with the management system 70.

The management system 70 is a system for remotely managing various management target devices (the industrial equipment 31a, the sensor 31b, and the device with agent 33) in each of the customer systems 60a, 60b, and 60c via the Internet 15. FIG. 12 illustrates a case in which the management system 70 includes a remote device management apparatus 11' and a remote management agent apparatus 12'.

The remote device management apparatus 11' includes functions similar to the functions of the remote device management apparatus 11 described in the first embodiment. The remote management agent apparatus 12' includes functions similar to the functions of the remote management agent apparatus 12 described in the first embodiment. For example, the management system 70 issues various operating instructions (such as changing setting value, updating a firmware, or turning on/off power) to the management target devices in each of the customer systems 60a, 60b, and 60c, or acquires various information (such as status information, setting information, or log information) from the management target devices in each of the customer systems 60a, 60b, and 60c.

In the above industrial equipment management system 20, the remote device management apparatus 11', the remote management agent apparatus 12', the management agent apparatus 13', the management agent apparatus 32, and the device with agent 33 include general purpose computer components. That is, similar to the hardware configuration illustrated in FIG. 2, these apparatuses include at least a CPU for executing various programs, a ROM, a RAM, and a storage unit used by the CPU executing the programs, and a communication unit such as a modem or a network interface.

In the industrial equipment management system 20 configured as described above, similar to the remote management system 10 according to the first embodiment, the remote management agent apparatus 12' in the management system 70 identifies a device agent apparatus (a management agent apparatus 13', a management agent apparatus 32, or a device with agent 33) capable of communicating in compliance with a communication mode supported by a management target device (an industrial equipment 31a, a sensor 31b, or a device with agent 33), and forwards request data from the remote device management apparatus 11' in the management system 70 to the identified device agent apparatus.

Accordingly, in a case in which a new electronic device is added as a management target device in the industrial equipment management system 20, by only performing a setting such that a remote management agent apparatus 12' can identify a device agent apparatus communicable with the management target device, the industrial equipment management system 20 will be able to manage the management target device remotely. Hence, according to the industrial equipment management system 20, various electronic devices each supporting different types of communication modes can be easily added as management target devices.

A management target device, which is treated as a target of remote management by the remote management system in the present disclosure, is not limited to an imaging device, and may be various types of equipment having a communication function (such as a network-connected home appliance, a vending machine, medical equipment, industrial equipment, power supply equipment, an air conditioning system, or a measuring system for gas, water, electricity, and the like). In addition, a management target device may be a detection device (such as an image capturing device and a sound collecting device) which is provided around the above equipment to detect a state of the equipment.

Examples of industrial equipment include processing equipment, inspection equipment, conveying equipment, and picking equipment. In a case in which industrial equipment is to be treated as a management target device, the industrial equipment may send, as response data, identification information of the equipment, operating status of the equipment, presence or absence of an abnormal operation of the equipment, information about replacement time of consumables, a result of inspection by the equipment, or the like, to the management system 70. In sending the response data, various types of transmitting methods may be used. For example, the response data to be sent may be formatted as an image format.

Examples of medical equipment include an ophthalmoscopy device, an X-ray inspection apparatus, a sphygmomanometer, a body fat meter, an optometer, and a pacemaker. In a case in which medical equipment is to be treated as a management target device, the medical equipment may send, as response data, identification information of the equipment, operating status of the equipment, presence or absence of an abnormal operation of the equipment, a result of measurement by the equipment, or the like, to the management system 70. In sending the response data, various types of transmitting methods may be used. For example, the response data to be sent may be formatted as an image format.

Although the preferred embodiments of the present invention have been described, the present invention is not limited to these embodiments. Various variations and enhancements may be applied within the scope of the subject matters described in the claims.

What is claimed is:

1. A remote management agent apparatus comprising:
   a memory storing a program; and
   a processor configured to execute the program to implement a process including
   receiving request data issued from a remote device management apparatus to a management target device managed by the remote device management apparatus remotely;
   identifying, from among a plurality of device agent apparatuses configured to transmit data received from the remote management agent apparatus to the management target device, a device agent apparatus capable of communicating in compliance with a communication mode supported by the management target device; and
   forwarding the request data to the identified device agent apparatus to cause the identified device agent apparatus to transmit the request data to the management target device.

2. The remote management agent apparatus according to claim 1, the process further including:
   referring to first mapping information representing a mapping between the management target device and the device agent apparatus, in order to identify the device agent apparatus capable of communicating in compliance with the communication mode supported by the management target device.

3. The remote management agent apparatus according to claim 1, the process further including:
   receiving, via the device agent apparatus, response data output by the management target device in response to the request data;
   identifying, by referring to second mapping information representing a mapping between the device agent apparatus and the remote device management apparatus, the remote device management apparatus associated with the device agent apparatus via which the response data is sent;
   determining the identified remote device management apparatus as a destination of the response data; and
   forwarding the response data to the remote device management apparatus.

4. The remote management agent apparatus according to claim 1, wherein the communication mode is defined by at least one of a type of a communication protocol, a type of the management target device, information of a communication port, and a detailed definition of the communication protocol.

5. The remote management agent apparatus according to claim 4, wherein the communication protocol is HTTP, SNMP, ICMP, or MQTT; and the information of the communication port is 80/tcp.

6. A remote management system comprising:
   a remote management agent apparatus; and
   a plurality of device agent apparatuses;
   wherein the remote management agent apparatus includes a memory storing a program and a processor configured to execute the program to implement a process including
   receiving request data issued from a remote device management apparatus to a management target device managed by the remote device management apparatus remotely;
   identifying, from among the plurality of device agent apparatuses configured to transmit data received from the remote management agent apparatus to the management target device, a device agent apparatus capable of communicating in compliance with a communication mode supported by the management target device; and forwarding the request data to the identified device agent apparatus to cause the identified device agent apparatus to transmit the request data to the management target device.

7. The remote management system according to claim 6, the device agent apparatus being configured to identify a communication mode supported by the management target device by referring to communication mode definition information including a definition of the communication mode supported by the management target device, and to communicate with the management target device in compliance with the identified communication mode supported by the management target device.

8. The remote management system according to claim 7, the device agent apparatus being configured:

in response to an addition of a new management target device, to register the communication mode definition information and communication setting information for the new management target device with the device agent apparatus; and to communicate with the new management target device in compliance with the communication mode supported by the new management target device, based on the registered communication mode definition information, and on the registered communication setting information.

9. The remote management system according to claim 7, the device agent apparatus being further configured to acquire, by a communication with the management target device, information concerning the management target device at every instance of time to perform schedule execution recorded in the schedule execution information, to provide the information concerning the management target device to the remote device management apparatus.

10. The remote management system according to claim 6, the process further including:

referring to first mapping information representing a mapping between the management target device and the device agent apparatus, in order to identify the device agent apparatus capable of communicating in compliance with the communication mode supported by the management target device.

11. The remote management system according to claim 6, the process further including:

receiving, via the device agent apparatus, response data output by the management target device in response to the request data;

identifying, by referring to second mapping information representing a mapping between the device agent apparatus and the remote device management apparatus, the remote device management apparatus associated with the device agent apparatus via which the response data is sent;

determining the identified remote device management apparatus as a destination of the response data; and forwarding the response data to the remote device management apparatus.

12. The remote management system according to claim 6, wherein the communication mode is defined by at least one of a type of a communication protocol, a type of the management target device, information of a communication port, and a detailed definition of the communication protocol.

13. The remote management system according to claim 12, wherein the communication protocol is HTTP, SNMP, ICMP, or MQTT; and the information of the communication port is 80/tcp.

14. A remote management method performed by a remote management agent apparatus comprising:

receiving request data issued from a remote device management apparatus to a management target device managed by the remote device management apparatus remotely;

identifying, from among a plurality of device agent apparatuses configured to transmit data received from the remote management agent apparatus to the management target device, a device agent apparatus capable of communicating in compliance with a communication mode supported by the management target device; and forwarding the request data to the identified device agent apparatus to cause the identified device agent apparatus to transmit the request data to the management target device.

15. The remote management method according to claim 14, further comprising:

referring to first mapping information representing a mapping between the management target device and the device agent apparatus, in order to identify the device agent apparatus capable of communicating in compliance with the communication mode supported by the management target device.

16. The remote management method according to claim 14, further comprising:

receiving, via the device agent apparatus, response data output by the management target device in response to the request data;

identifying, by referring to second mapping information representing a mapping between the device agent apparatus and the remote device management apparatus, the remote device management apparatus associated with the device agent apparatus via which the response data is sent;

determining the identified remote device management apparatus as a destination of the response data; and forwarding the response data to the remote device management apparatus.

17. The remote management method according to claim 14, further comprising:

registering with the device agent apparatus, in response to an addition of a new management target device, communication mode definition information including a definition of the communication mode supported by the new management target device; and performing communication between the device agent apparatus and the new management target device in compliance with the communication mode supported by the new management target device, based on the communication mode definition information.

18. The remote management method according to claim 17, further comprising:

acquiring, through the device agent apparatus, information concerning the management target device from the management target device at every instance of time to perform schedule execution recorded in the device agent apparatus, to provide the information concerning the management target device to the remote device management apparatus.

19. The remote management method according to claim 14, wherein the communication mode is defined by at least one of a type of a communication protocol, a type of the management target device, information of a communication port, and a detailed definition of the communication protocol.

20. The remote management method according to claim 19, wherein the communication protocol is HTTP, SNMP, ICMP, or MQTT; and the information of the communication port is 80/tcp.

* * * * *